United States Patent
Shroyer et al.

(10) Patent No.: US 12,330,471 B1
(45) Date of Patent: Jun. 17, 2025

(54) HORIZONTAL DAMPER FOR A SUSPENSION ASSEMBLY OF AN ELECTRIFIED VEHICLE

(71) Applicant: Ford Global Technologies, LLC, Dearborn, MI (US)

(72) Inventors: Jared Shroyer, Madison Heights, MI (US); Shane Edward Foley, Milford, MI (US); James Leroy Swayze, South Rockwood, MI (US); Harini Guduguntla, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/803,474

(22) Filed: Aug. 13, 2024

(51) Int. Cl.
*B60G 9/00* (2006.01)
*B60G 13/00* (2006.01)

(52) U.S. Cl.
CPC .......... *B60G 9/003* (2013.01); *B60G 13/003* (2013.01); *B60G 2200/422* (2013.01); *B60G 2202/112* (2013.01); *B60G 2204/4102* (2013.01)

(58) Field of Classification Search
CPC .............. B60G 9/003; B60G 13/003; B60G 2200/422; B60G 2202/112; B60G 2204/4102
See application file for complete search history.

(56) References Cited

U.S. PATENT DOCUMENTS

| | | | | | |
|---|---|---|---|---|---|
| 4,322,061 | A | * | 3/1982 | Masser | B60G 11/113 267/269 |
| 12,017,520 | B2 | * | 6/2024 | Charbonneau | B60K 1/00 |
| 2005/0253354 | A1 | | 11/2005 | Riley et al. | |
| 2020/0346506 | A1 | * | 11/2020 | Laforce | B60G 9/027 |

FOREIGN PATENT DOCUMENTS

| | | | | | |
|---|---|---|---|---|---|
| EP | 1002674 | A2 | * | 5/2000 | B60G 11/10 |
| EP | 2500200 | A1 | | 9/2012 | |
| EP | 3196059 | B1 | | 7/2017 | |
| GB | 2030267 | A | * | 4/1980 | B60G 11/04 |
| JP | 2004237904 | A | * | 8/2004 | B60G 11/44 |
| JP | 2005096494 | A | * | 4/2005 | B60G 11/04 |
| JP | 2008049878 | A | * | 3/2008 | |
| WO | 9712769 | A2 | | 4/1997 | |
| WO | 2021105150 | A1 | | 6/2021 | |

* cited by examiner

*Primary Examiner* — Faye M Fleming
(74) *Attorney, Agent, or Firm* — Burr & Forman LLP; Lorne Forsythe

(57) ABSTRACT

The suspension system may include an axle operably coupled to a frame of the vehicle, an electric motor operably coupled to the axle to propel the vehicle, one or more wheels operably coupled to the axle, at least one vertical damper extending substantially perpendicular to a driving surface and operably coupled to the frame and the axle, and a horizontal damper extending substantially parallel to the driving surface. A first distal end of the horizontal damper may operably couple to the frame, and a second distal end of the horizontal damper may operably couple to the electric motor.

20 Claims, 5 Drawing Sheets

HORIZONTAL DAMPER FOR A SUSPENSION ASSEMBLY OF AN ELECTRIFIED VEHICLE

TECHNICAL FIELD

Figure 1:
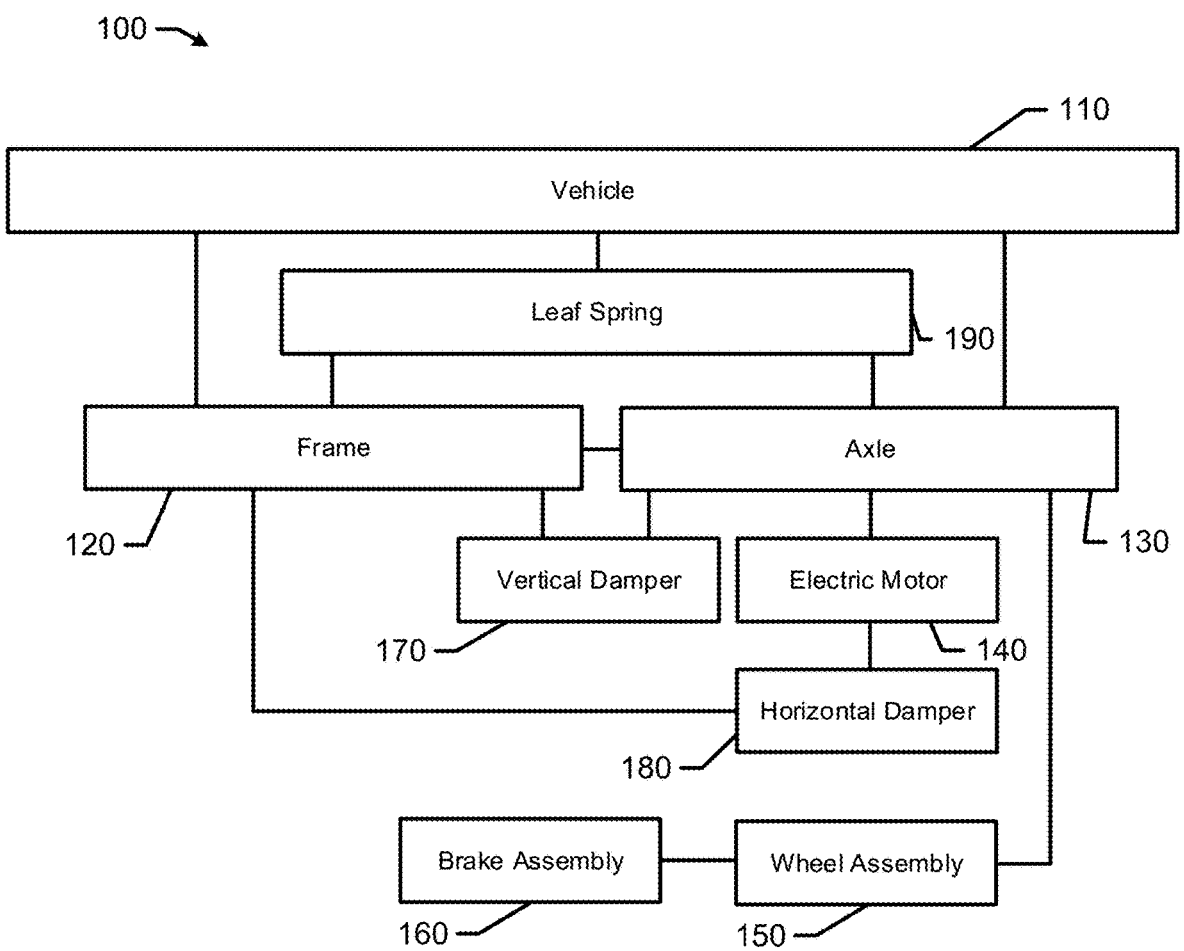

Example embodiments generally relate to suspension assembly components and, more particularly, relate to a horizontal damper for an electric vehicle.

BACKGROUND

Electric motors for an electrified vehicle add weight to an axle of the vehicle. Non-smooth road conditions may cause oscillations of the axle. As such, a modal response may occur on an axle of an electric vehicle due to the addition of an electric motor. The modal response may cause added vehicle oscillations. Accordingly, it may be desirable to limit the modal response on an electrified vehicle's axle to increase operator comfort.

BRIEF SUMMARY OF SOME EXAMPLES

In accordance with an example embodiment, a suspension system of a vehicle may be provided. The suspension system may include an axle operably coupled to a frame of the vehicle, an electric motor operably coupled to the axle to propel the vehicle, one or more wheels operably coupled to the axle, one or more vertical dampers extending substantially perpendicular to a driving surface and operably coupled to the frame and the axle, and a horizontal damper extending substantially parallel to the driving surface. A first distal end of the horizontal damper may operably couple to the frame, and a second distal end of the horizontal damper may operably couple to the electric motor or the axle.

In another example embodiment, a suspension damper assembly for a vehicle may be provided. The suspension damper assembly may include a horizontal damper operably coupled to a frame and an electric motor of the vehicle and one or more vertical dampers operably coupled to the frame and an axle of the vehicle. The electric motor may be operably coupled to the axle to propel the vehicle, and the axle may be operably coupled to the frame and one or more wheels. The one or more vertical dampers may extend substantially perpendicular to a driving surface, and the horizontal damper may extend substantially parallel to the driving surface. A first distal end of the horizontal damper may operably couple to the frame, and a second distal end of the horizontal damper may operably couple to the electric motor or the axle.

BRIEF DESCRIPTION OF THE SEVERAL VIEWS OF THE DRAWING(S)

Figure 2A:
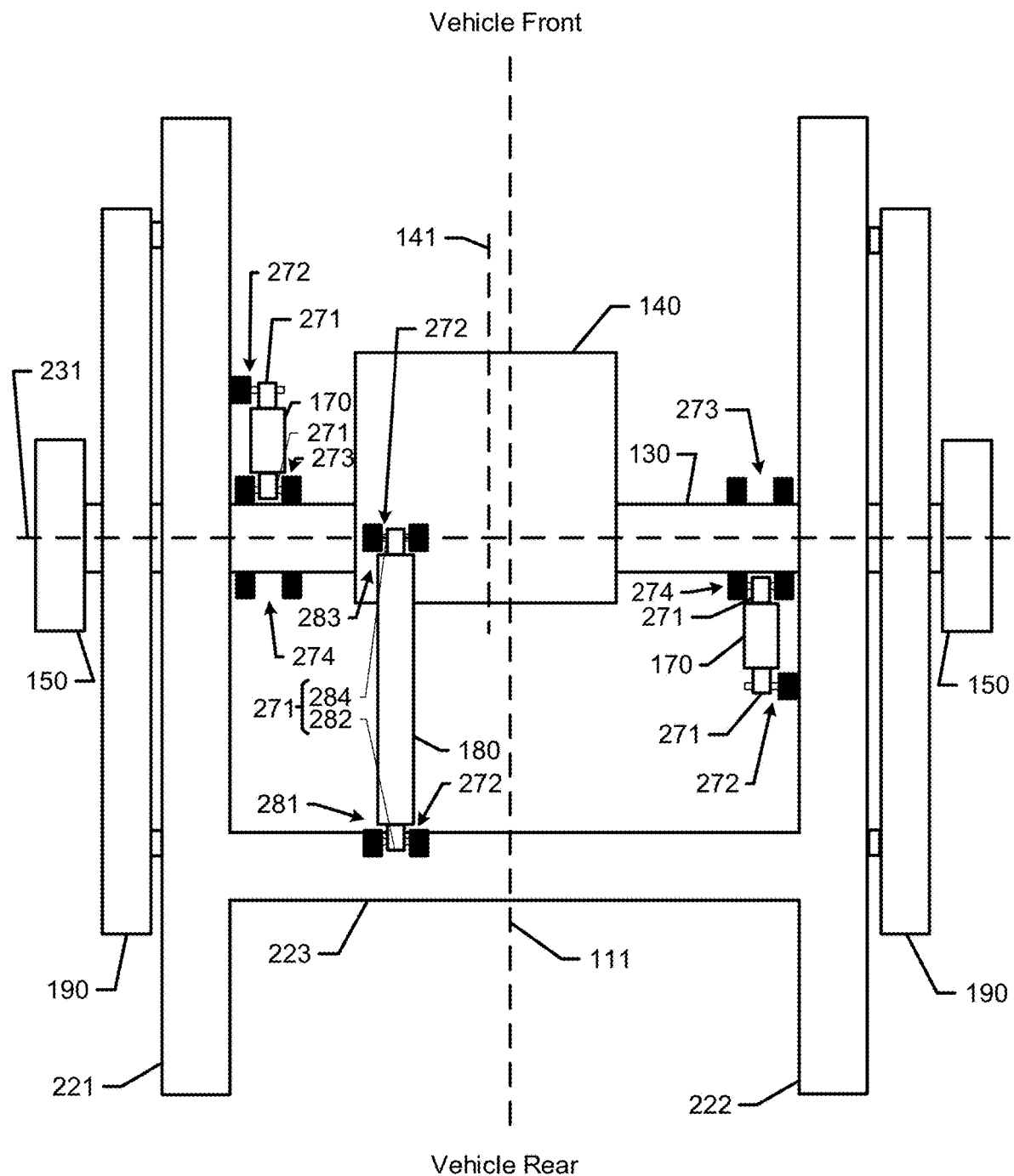
Figure 2B:
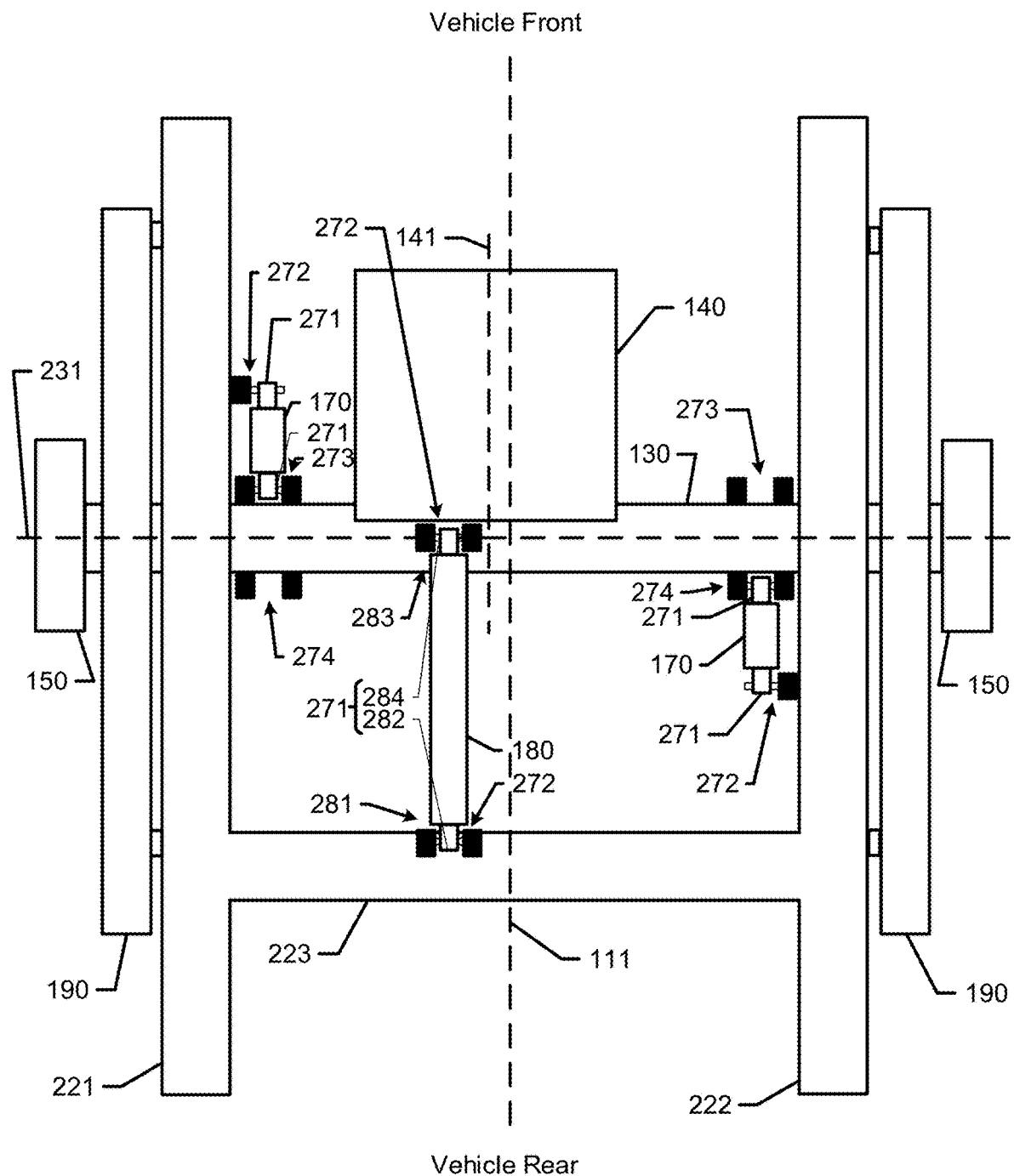
Figure 2C:
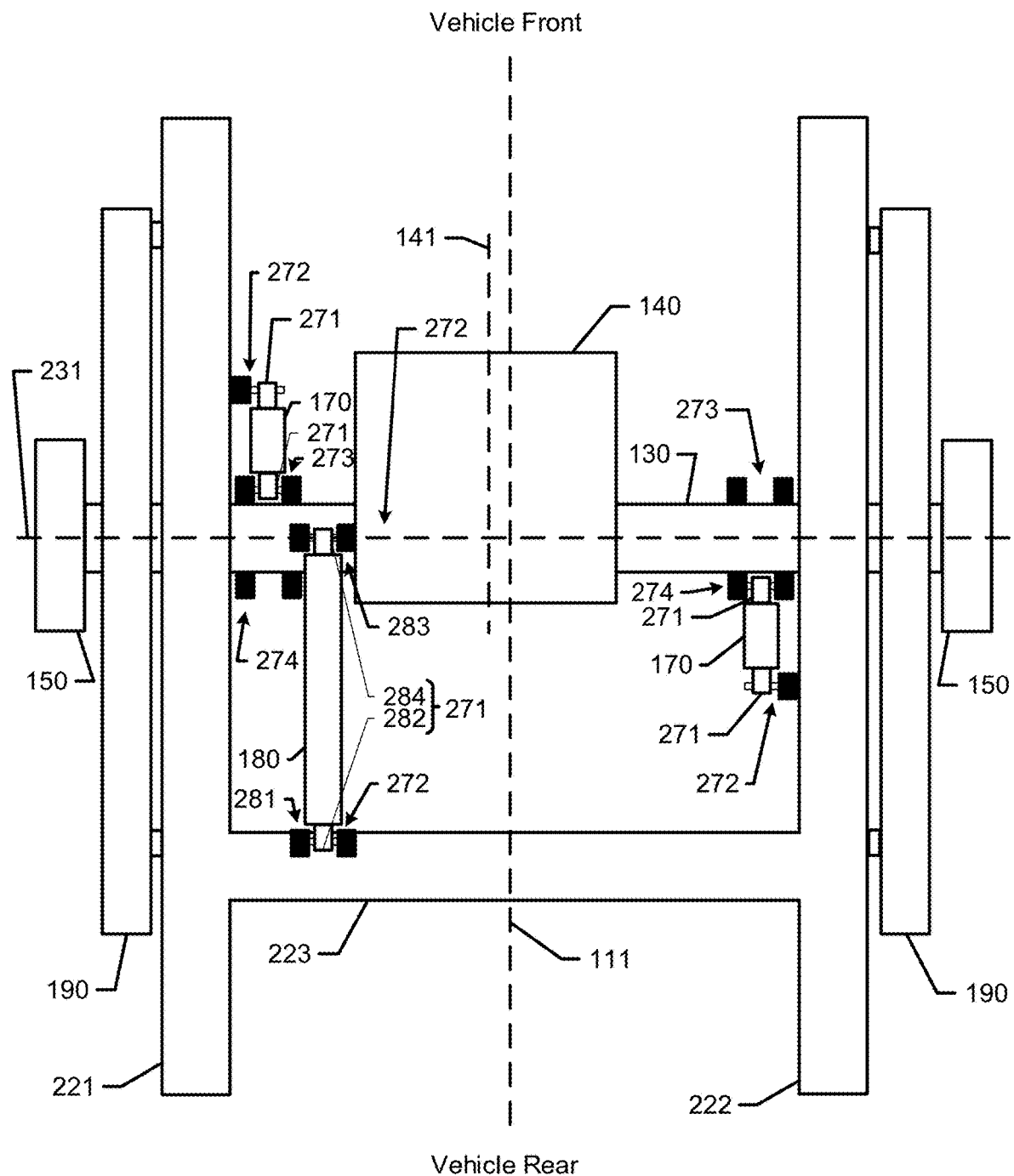
Figure 3:
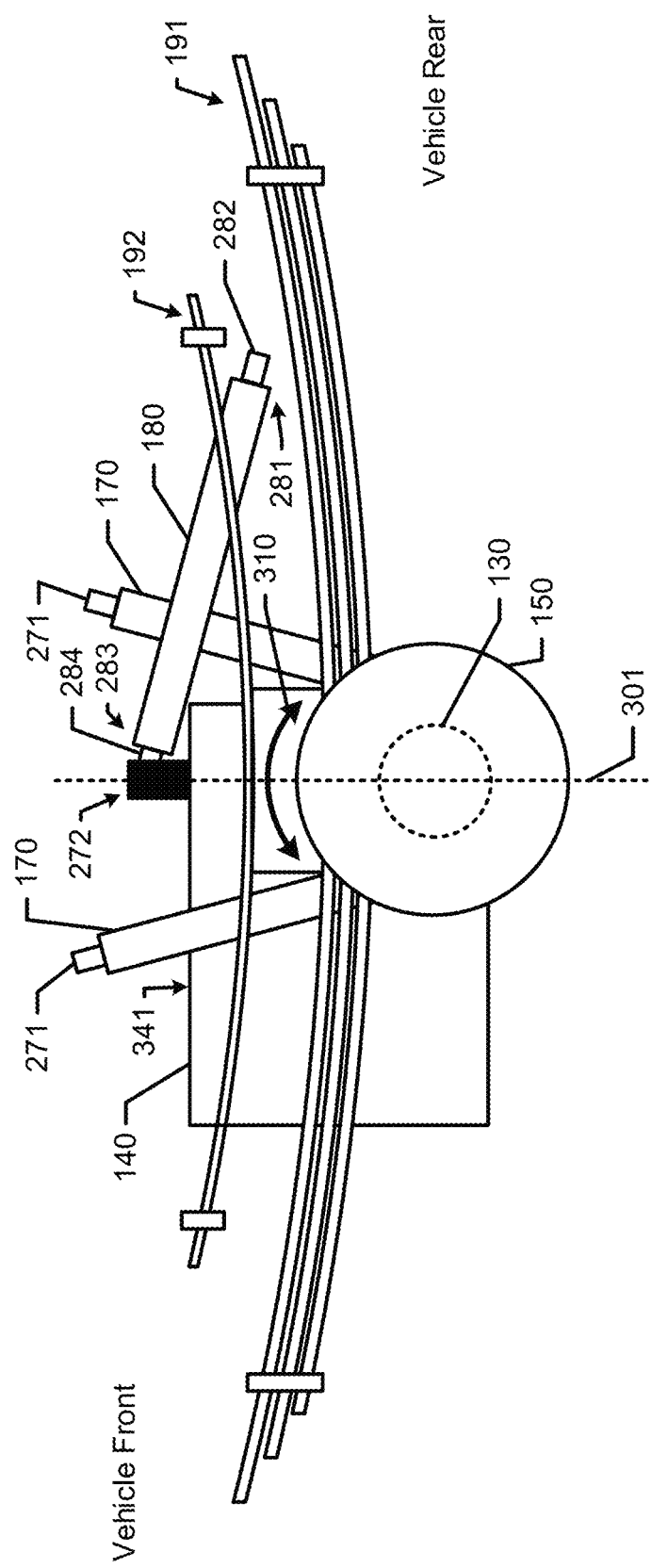

Having thus described the invention in general terms, reference will now be made to the accompanying drawings, which are not necessarily drawn to scale, and wherein:

FIG. 1 depicts a block diagram of a suspension assembly for a vehicle in accordance with an example embodiment;

FIG. 2, which includes FIGS. 2A, 2B, and 2C, illustrate top views of a suspension assembly in accordance with example embodiments; and FIG. 3 depicts a side view of a suspension assembly in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein may address the issues described above. In this regard, for example, some embodiments may provide a horizontal damper to decrease a modal response and oscillations within a vehicle. As a result, the addition of the horizontal damper may increase operator comfort.

FIG. 1 illustrates a block diagram of a suspension assembly 100 for a vehicle 110 in accordance with an example embodiment. As seen in FIG. 1, some cases, the vehicle 110 may include a frame 120. In an example embodiment, the frame 120 may be a chassis or body of the vehicle 110. In some cases, the chassis or frame 120 may support and may form the foundation structure of the vehicle 110. In an example embodiment, the chassis and frame may be formed of one or more casted subframes, and a suspension damper may be operably coupled to the chassis or frame 120 to help operably couple a brake assembly 160 and/or a wheel assembly 150 to the chassis or frame 120. The vehicle 110 may include an axle 130.

In some cases, the vehicle 110 may be an electrified vehicle, and the axle 130 may be an e-axle. An electrified vehicle may be a fully electric vehicle or a hybrid vehicle. In an example embodiment, the hybrid vehicle may be a plug-in hybrid vehicle. The axle 130 may include an electric motor 140 that may be operably coupled the axle 130. In some cases, the electric motor 140 may propel the vehicle 110 via driving the axle 130. A battery of the vehicle 110 may power the electric motor 140. The electric motor 140 may drive the axle via a gearbox utilizing the power from the battery. The gearbox may be internal to the electric motor 140. In an example embodiment, the axle 130 may be a front axle and/or a rear axle of the vehicle 110. In some cases, only the rear axle may be the axle 130, and only the rear axle may include an electric motor 140.

In some embodiments, the axle 130 may be operably coupled to a wheel assembly 150 and a brake assembly 160. In some cases, the wheel assembly 150 may include a tire and a wheel rim and may operably couple with the brake assembly 160 and the axle 130. The brake assembly 160 may include a brake rotor and other brake assembly components to help stop or slow the vehicle 110 and specifically the wheel assembly 150. In an example embodiment, the axle 130 may have a separate wheel assembly and separate brake assembly at each distal end of the axle 130. In some cases, the brake assembly 160 may be operably coupled to the axle 130 via the wheel assembly 150. In an example embodiment, the brake assembly 160 may be directly operably coupled to the axle 130. In some cases, the wheel assembly 150 may be operably coupled to the axle 130 via the brake assembly 160.

In some embodiments, the suspension assembly 100 may include a vertical damper 170. In some cases, the vertical damper 170 may be one or more vertical dampers. For example, the vehicle 110 may include one instance of the vertical damper 170 on a first side of the vehicle 110 and another instance of the vertical damper 170 on a second side of the vehicle 110, or also known as a staggered shock set up. In an example embodiment, the horizontal damper 180 may be paired with two vertical dampers that are both forward of a centerline of the axle 130. In some cases, the horizontal damper 180 may be paired with two vertical dampers that are both rearward/aft of a centerline of the axle 130. In an example embodiment, the vertical damper 170 may be operably coupled to the frame 120 and the axle 130 of the vehicle 110. The vertical damper 170 may absorb or dampen the compression and rebound of the frame 120 and the axle 130 while the vehicle 110 is in motion. The vertical damper 170 may be referred to as and/or be a vertical shock absorber, a strut, or any other suspensions member that may dampen the vehicle 110. The vertical damper 170 may be positioned at angle between 70 degrees and 110 degrees relative to the driving surface driven on by the vehicle 110.

In an example embodiment, the suspension assembly 100 may include a horizontal damper 180. The horizontal damper 180 may be a similar type of damper or even an identical damper to the vertical damper 170. In some cases, the horizontal damper 180 may be a shock absorber or any other type of damper that may limit vibrations and/or oscillations within the vehicle 110. For example, the horizontal damper 180 may be a monotube shock absorber, a twin-tube shock absorber, or a bladder shock absorber depending on the type of vehicle 110 or the desired damping control. In some cases, the horizontal damper 180 and the vertical damper 170 may be active, semi-active, or passive dampers. In an example embodiment, the active or semi-active dampers may utilize measurements from a sensor suite of the vehicle 110 to adjust the dampers.

The horizontal damper 180 may be operably coupled to the electric motor 140. In an example embodiment, the horizontal damper 180 may be operably coupled to the axle 130 only via the electric motor 140. In some cases, the horizontal damper 180 may be operably coupled to other components of the vehicle 110, including directly to the axle 130 and/or the frame 120. For example, in the case of a "banjo" style axle, the structure of the axle 130 may be positioned behind the electric motor 140, thus the axle 130 may be the primary attachment point for the horizontal damper 180 instead of the electric motor 140. The horizontal damper 180 may operably couple to a variety of different locations on the axle 130. The horizontal damper 180 may operably couple to the axle 130 on either lateral side of the electric motor 140. In some cases, the horizontal damper 180 may attach to top side of the axle 130 furthest away from the driving surface, a bottom side of the axle 130 closest to the driving surface, or any other location along the axle 130 that maintains the function of the horizontal damper 180. In an example embodiment, the horizontal damper 180 may be disposed either frontward-facing or rearward-facing. For example, depending on other components and the necessary instillation requirements, the horizontal damper 180 orientation may be flipped and still maintain its expected degree of damping. The horizontal damper 180 may be positioned at angle between +/−20 degrees at a normal or typical ride height of the vehicle 110. A normal or typical ride height of the vehicle may be the ride height of the vehicle 110 while in a steady-state (i.e. constant speed, constant rate of change of vehicle velocity, flat driving surface, smooth driving surface, parked, etc.) and while the vehicle 110 is not on a vehicle hoist.

In some cases, the vehicle 110 may include a leaf spring 190. In an example embodiment, the leaf spring 190 may be one of multiple sets of leaf springs. For example, there may be at least two sets of leaf springs 190 disposed at each individual end of the axle 130 of the vehicle 110. The leaf spring 190 may assist the suspension assembly in limiting vibrations and oscillations of the vehicle 110 during operation. In some cases, the horizontal damper 180 may supplement the leaf spring 190 to limit vibrations and oscillations of the vehicle 110, or more specifically the axle 130 and the electric motor 140. For example, the horizontal damper 180 may further dampen oscillations of the electric motor 140 or oscillations of the axle 130 resultant from the electric motor 140. In an example embodiment, the leaf spring 190 may be operably coupled between the frame 120 and the axle 130, and the horizontal damper 180 may be operably coupled between the frame 120 and the electric motor 140.

FIG. 2A illustrates a top view of a suspension assembly in accordance with an example embodiment. FIG. 3 illustrates a side view of a suspension assembly without the frame 120 showing in accordance with an example embodiment. As shown in FIG. 2A, the frame 120 of the vehicle 110 may include two longitudinal support members extending along a longitudinal length of the vehicle 110. In some cases, the two longitudinal support members may include a left longitudinal support member 221, which may be disposed on a left side of the vehicle 110, and a right longitudinal support member 222, which may be disposed on a right side of the vehicle 110. The left longitudinal support member 221 and the right longitudinal support member 222 may be substantially parallel with one another, as well as parallel with a longitudinal centerline 111 of the vehicle 110. In an example embodiment, the axle 130 may be operably coupled to the vehicle 110 via the two longitudinal support members. In some cases, the axle 130 may be directly operably coupled to the two longitudinal support members, or the axle 130 may be operably coupled to the two longitudinal support members via a bracket or other coupling mechanism. In an example embodiment, the horizontal damper 180 may be disposed between the left longitudinal support member 221 and the right longitudinal support member 222. In some case, the horizontal damper 180 may be substantially parallel with the left longitudinal support member 221 and the right longitudinal support member 222.

In an example embodiment, the frame 120 may further include a cross member 223. The cross member 223 may be substantially parallel with the axle 130. In some cases, the cross member 223 may be disposed closer to the rear of the vehicle 110 than the axle 130. In an example embodiment, the cross member 223 may be substantially perpendicular with the left longitudinal support member 221 and the right longitudinal support member 222. Substantially parallel may be defined as deviating by less than 10 degrees from parallel. In some cases, substantially parallel and substantially perpendicular may be defined as deviating by less than 20 degrees from parallel and perpendicular, respectively.

In an example embodiment, the axle 130 may include a wheel assembly 150 at each distal end of the axle 130. In some cases, each distal end of the axle 130 may include a brake assembly 160 (not shown in FIG. 2). In some cases, the vehicle 110 may include a leaf spring 190 disposed between the wheel assembly 150 and at least one of the two longitudinal support members. The leaf spring 190 may include a plurality of individual leaf springs operably coupled together or to one another via a variety of coupling mechanisms, including but not limited to brackets, bolts, ties, or any other coupling mechanisms to secure the plurality of leaf springs to one another. The leaf spring 190 may be operably coupled to the frame 120 via the at least one of the two longitudinal support members. In some cases, the leaf spring 190 may be operably coupled to the frame 120 via the same coupling mechanism that may allow the plurality of individual leaf springs to be operably coupled.

In an example embodiment, the electric motor 140 may be operably coupled directly to the axle 130. For example, the axle 130 may be operably coupled to the electric motor 140 via an axle housing that is directly part of the electric motor 140. The axle housing may be part of the electric motor housing. In some cases, the axle 130 may be two separate axles connected via a differential. In an example embodiment, the two separate axles may connect via the differential within the axle housing. The electric motor 140 may be offset from a lateral axis 231 of the axle 130. In some cases, the lateral axis 231 is a central axis of the axle 130 along the horizontal length of the vehicle 110. In an example embodiment, the electric motor 140 may also be centered along the lateral axis 231. FIGS. 2B and 2C illustrate top views of a suspension assembly in accordance with additional example embodiments. As shown in FIGS. 2B and 2C, the horizontal damper 180 may operably couple directly to the axle 130. The horizontal damper 180 may operably couple to the axle 130 laterally besides the electric motor 140 or, in some cases, behind the electric motor 140 (i.e. in a "banjo" style axle).

In some cases, the vertical damper 170 and the horizontal damper 180 may be operably coupled to the vehicle 110 via a bushing 271. For example, each one of the vertical dampers 170 and the horizontal damper 180 may have a bushing 271 on each of their distal ends. Each bushing 271 may operably couple with a mounting assembly 272. In some cases, the mounting assembly 272 may include one or more mounting plates and a fastener. In an example embodiment, the bushing 271 may be operably coupled and/or secured to the mounting assembly 272 via the fastener. In some cases, the fastener may be a rod, bolt, pin, or screw, and the one or more mounting plates may be threaded. In an example embodiment, the one or more mounting plates of the mounting assembly 272 may be a pair of mounting plates with the bushing 271 operably coupled between the pair of mounting plates via the fastener. In some cases, the fastener may further include a cap or nut to help secure the bushing 271 to the mounting assembly 272. In an example embodiment, the vertical damper 170 and horizontal damper 180 may be operably coupled to vehicle 110 via a variety of coupling mechanisms, including but not limited to a ball-and-socket, a pivot connector, or any other coupling mechanism that does not limit damper functionality.

In some cases, the vertical damper 170 may be operably coupled directly to the frame 120 and the axle 130 via the mounting assembly 272. For example, one distal end of the vertical damper 170 may be operably coupled to a mounting assembly 272 disposed on an inner side of the at least one of the two longitudinal support members. The inner side of the at least one of the two longitudinal support members may be the side closest to the longitudinal centerline 111 of the vehicle 110. The other distal end of the vertical damper 170 may be operably coupled to a front-facing or rear-facing side of the axle 130 via the mounting assembly 272. In an example embodiment, the axle 130 may include both a front-facing mounting assembly 273 and a rear-facing mounting assembly 274 to ensure case of assembly for different suspension configurations. For example, in some cases, a vertical damper 170 disposed on the left side of the vehicle 110 may be disposed in front of the axle 130, thus utilizing the front-facing mounting assembly 273. A vertical damper 170 disposed on the right side of the vehicle 110 may be disposed behind the axle 130, thus utilizing the rear-facing mounting assembly 274. The position of the vertical damper 170 utilizing either the front-facing mounting assembly 273 or the rear facing mounting assembly 274 may allow for vehicle assembly flexibility, as well as adding two-handed functionality to the axle 130.

In an example embodiment, the horizontal damper 180 may have a first distal end 281 with a first bushing 282 and a second distal end 283 with a second bushing 284. In some cases, the first distal end 281 of the horizontal damper 180 may operably couple to the frame 120. For example, the first distal end 281 may operably couple to a mounting assembly 272 disposed on the cross member 223 of the frame 120 via the first bushing 282. In an example embodiment, the second distal end 283 of the horizontal damper 180 may operably couple to the electric motor 140 and thus the axle 130. For example, in some cases, the second distal end 283 may operably couple to a mounting assembly 272 disposed on a first surface of the electric motor 140 via the second bushing 284. The first surface 341 of the electric motor 140 may be a surface of the electric motor 140 disposed furthest away from the driving surface driven on by the vehicle 110.

In an example embodiment, the horizontal damper 180 may be disposed closer to a longitudinal centerline 111 of the vehicle 110 than the vertical damper 170. In some cases, a centrally-disposed horizontal damper 180 may help limit oscillations of the axle 130 without needing multiple horizontal dampers. In an example embodiment, the axle 130, the electric motor 140, and the second distal end 283 of the horizontal damper 180 may each be disposed along a vertically extending reference line 301 substantially perpendicular to the driving surface. Aligning the axle 130, the electric motor 140, and the second distal end 283 of the horizontal damper 180 may allow for optimization in a modal response 310 and oscillation reduction, as the alignment may allow for damping to be centralized. Particularly, the centralized alignment of the components all along the vertically extending reference line 301 may help limit the effect of the modal response 310 as an effect of the electric motor 140 mass. In some cases, the modal response 310 may be represented by the oscillations of the electric motor 140 around the axle 130, as well as oscillations of the axle 130 itself. The vehicle 110 may cause the modal response 310 by driving over bumps and rough surfaces. This alignment may reduce the time for the modal response 310 to dissipate, as the damping is now located at the creation of the modal response 310. In some cases, the position of the horizontal damper 180 closer to the longitudinal centerline 111 may increase the modal response 310 and oscillation reduction via its more distribution between the distal ends of the axle 130.

In some cases, the second distal end 283 of the horizontal damper 180 may further center along the lateral axis 231 of the axle 130 when operably coupled to the electric motor 140. Thus, the location of the second distal end 283 of the horizontal damper 180 may be closer to the creation of the modal response 310, as well as the location of the object to dampen (i.e. the axle 130).

In an example embodiment, the second distal end 283 of the horizontal damper 180 may pivot. For example, the operable coupling of the mounting assembly 272 and the second bushing 284 of the second distal end 283 may allow for pivoting of the horizontal damper 180 about a horizontal axis of the axle 130. In some cases, the horizontal axis the horizontal damper 180 may pivot around is lateral axis 231 of the axle 130. Pivoting of the horizontal damper 180 about a horizontal axis of the axle 130 may assist in the damping of the axle 130. The pivoting of the horizontal damper 180 may enable by the type of fastener operably coupling the second bushing 284 and the mounting assembly 272.

In an example embodiment, the horizontal damper 180 may be offset from the longitudinal centerline 111 of the vehicle 110. In some cases, the electric motor 140 may be offset from the longitudinal centerline 111 of the vehicle 110. The horizontal damper 180 may be offset from the longitudinal center 141 of the electric motor 140, as well. The offset position of the horizontal damper 180 and the electric motor 140 may increase case of assembly for the suspension assembly 100 of the vehicle 110. The offset position of the horizontal damper 180 and the electric motor 140 may also allow space for other vehicle underbody components. In some cases, the offset of the horizontal damper 180 from the longitudinal centerline 111 of the vehicle 110 may be up to 2 feet, and the offset of the horizontal damper 180 from the longitudinal center 141 of the electric motor 140 may be up to 2 feet.

In an example embodiment, the vertical damper 170 and the horizontal damper 180 may be substantially perpendicular with one another. In some cases, the vertical damper 170 may not be substantially perpendicular and the horizontal damper 180 may not be substantially parallel with the driving surface. In an example embodiment, the leaf spring 190 may be at least two leaf spring sets separated by a component of the frame 120 or the wheel assembly 150. In some cases, a first leaf spring 191 may be disposed closer to the axle 130 and a second leaf spring 192 may be disposed further away from the axle 130.

In an example embodiment, the set of dampers and springs (i.e. the vertical damper 170, the horizontal damper 180, the first leaf spring 191, and the second leaf spring 192) may all assist in the reduction of the modal response 310 and oscillations within the vehicle 110 and the axle 130. The set of dampers and springs may aim to reduce the modal response 310 and oscillations by decreasing the time it takes the axle 130 and the electric motor 140 to reach a steady-state condition following the vehicle 110 creating the modal response 310 via driving over a bump or rough surface. In some cases, the set of dampers and springs, and particularly the horizontal damper 180, may be set up to reduce the minor modal response quickly rather than fully dampen a large instance of the modal response 310 (i.e. in off-road circumstances). In an example embodiment, the set of dampers and springs may be set up towards the reduction of large instance of the modal response 310, often present in the off-road circumstances.

In some cases, the damping coefficient of the horizontal damper 180 may be adjusted based on the desired type of reduction of the modal response 310 and oscillations. In an example embodiment, the horizontal damper 180 may have a variable damping coefficient or may have a preset damping coefficient based on vehicle classification.

A suspension system of a vehicle may be therefore provided. The suspension system may include an axle operably coupled to a frame of the vehicle, an electric motor operably coupled to the axle to propel the vehicle, one or more wheels operably coupled to the axle, one or more vertical dampers extending substantially perpendicular to a driving surface and operably coupled to the frame and the axle, and a horizontal damper extending substantially parallel to the driving surface. A first distal end of the horizontal damper may operably couple to the frame, and a second distal end of the horizontal damper may operably couple to the electric motor or the axle.

The suspension system of a vehicle of some embodiments may include additional features, modifications, augmentations and/or the like to achieve further objectives or enhance performance of the suspension system. The additional features, modifications, augmentations and/or the like may be added in any combination with each other. Below is a list of various additional features, modifications, and augmentations that can each be added individually or in any combination with each other. For example, the first distal end may be operably coupled to the frame via a first bushing, and the second distal end may be operably coupled to the electric motor via a second bushing directly operably coupled to a first surface of the electrical motor. The first surface of the electric motor may be a surface of the electric motor disposed furthest away from the driving surface. In an example embodiment, the second distal end may be operably coupled the second bushing via a pin to allow pivoting of the horizontal damper about a horizontal axis. In some cases, the first distal end may be operably coupled to a cross member of the frame via the first bushing, and the cross member may be substantially parallel with the axle. In an example embodiment, the electric motor, the second distal end, and the axle may each disposed along a vertically extending reference line substantially perpendicular to the driving surface. In some cases, the vehicle may include a longitudinal centerline, and the horizontal damper may be disposed closer to the longitudinal centerline than the one or more vertical dampers. In an example embodiment, the frame of the vehicle may include two longitudinal support members disposed parallel to the longitudinal centerline, and the horizontal damper may be disposed between the two longitudinal support members. In some cases, the second distal end may be mounted to the electric motor at a location that is centered along a lateral axis of the axle. In an example embodiment, the axle may be a rear axle, and the horizontal damper may extend rearward away from the rear axle. In some cases, the horizontal damper may be offset from both a longitudinal center of the vehicle and a longitudinal center of the electric motor.

Suspension damper assembly for a vehicle of an example embodiment may be provided. The suspension damper assembly may include a horizontal damper operably coupled to a frame and an electric motor of the vehicle and the one or more vertical dampers operably coupled to the frame and an axle of the vehicle. The electric motor may be operably coupled to the axle to propel the vehicle, and the axle may be operably coupled to the frame and one or more wheels. The one or more vertical dampers may extend substantially perpendicular to a driving surface, and the horizontal damper may extend substantially parallel to the driving surface. A first distal end of the horizontal damper may operably couple to the frame, and a second distal end of the horizontal damper may operably couple to the electric motor or the axle.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to difficulties are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A suspension system of a vehicle, the suspension system comprising:
  an axle operably coupled to a frame of the vehicle;
  an electric motor operably coupled to the axle to propel the vehicle;
  one or more wheels operably coupled to the axle;
  one or more vertical dampers extending substantially perpendicular to a driving surface and operably coupled to the frame and the axle; and
  a horizontal damper extending substantially parallel to the driving surface,
  wherein a first distal end of the horizontal damper operably couples to the frame, and
  wherein a second distal end of the horizontal damper operably couples to the electric motor or the axle.

2. The suspension system of claim 1, wherein the first distal end is operably coupled to the frame via a first bushing,
  the second distal end is operably coupled to the electric motor via a second bushing directly operably coupled to a first surface of the electrical motor, and
  wherein first surface of the electric motor is a surface of the electric motor disposed furthest away from the driving surface.

3. The suspension system of claim 2, wherein the second distal end is operably coupled the second bushing via a pin to allow pivoting of the horizontal damper about a horizontal axis.

4. The suspension system of claim 2, wherein the first distal end is operably coupled to a cross member of the frame via the first bushing, and
  wherein the cross member is substantially parallel with the axle.

5. The suspension system of claim 1, wherein the electric motor, the second distal end, and the axle are each disposed along a vertically extending reference line substantially perpendicular to the driving surface.

6. The suspension system of claim 1, wherein the vehicle has a longitudinal centerline, and
  wherein the horizontal damper is disposed closer to the longitudinal centerline than the one or more vertical dampers.

7. The suspension system of claim 6, wherein the frame of the vehicle has two longitudinal support members disposed parallel to the longitudinal centerline, and
  wherein the horizontal damper is disposed between the two longitudinal support members.

8. The suspension system of claim 1, wherein the second distal end is mounted to the electric motor at a location that is centered along a lateral axis of the axle.

9. The suspension system of claim 1, wherein the axle is a rear axle, and
  wherein the horizontal damper extends rearward away from the rear axle.

10. The suspension system of claim 1, wherein the horizontal damper is offset from both a longitudinal center of the vehicle and a longitudinal center of the electric motor.

11. A suspension damper assembly for a vehicle, the suspension damper assembly comprising:
  a horizontal damper operably coupled to a frame and an electric motor of the vehicle; and
  one or more vertical dampers operably coupled to the frame and an axle of the vehicle,
  wherein the electric motor is operably coupled to the axle to propel the vehicle,
  wherein the axle is operably coupled to the frame and one or more wheels,
  wherein the one or more vertical dampers extends substantially perpendicular to a driving surface,
  wherein the horizontal damper extends substantially parallel to the driving surface,
  wherein a first distal end of the horizontal damper operably couples to the frame, and
  wherein a second distal end of the horizontal damper operably couples to the electric motor or the axle.

12. The suspension damper assembly of claim 11, wherein the first distal end is operably coupled to the frame via a first bushing,
  the second distal end is operably coupled to the electric motor via a second bushing directly operably coupled to a first surface of the electrical motor, and
  wherein first surface of the electric motor is a surface of the electric motor disposed furthest away from the driving surface.

13. The suspension damper assembly of claim 12, wherein the second distal end is operably coupled the second bushing via a pin to allow pivoting of the horizontal damper about a horizontal axis.

14. The suspension damper assembly of claim 12, wherein the first distal end is operably coupled to a cross member of the frame via the first bushing, and
  wherein the cross member is substantially parallel with the axle.

15. The suspension damper assembly of claim 11, wherein the electric motor, the second distal end, and the axle are each disposed along a vertically extending reference line substantially perpendicular to the driving surface.

16. The suspension damper assembly of claim 11, wherein the vehicle has a longitudinal centerline, and
  wherein the horizontal damper is disposed closer to the longitudinal centerline than the one or more vertical dampers.

17. The suspension damper assembly of claim 16, wherein the frame of the vehicle has two longitudinal support members disposed parallel to the longitudinal centerline, and
  wherein the horizontal damper is disposed between the two longitudinal support members.

18. The suspension damper assembly of claim 11, wherein the second distal end is mounted to the electric motor at a location that is centered along a lateral axis of the axle.

19. The suspension damper assembly of claim 11, wherein the axle is a rear axle, and
  wherein the horizontal damper extends rearward away from the rear axle.

20. The suspension damper assembly of claim 11, wherein the horizontal damper is offset from both a longitudinal center of the vehicle and a longitudinal center of the electric motor.

* * * * *